(12) United States Patent
Elshafie et al.

(10) Patent No.: US 11,991,009 B2
(45) Date of Patent: May 21, 2024

(54) COMBINED ACKNOWLEDGEMENT FEEDBACK USING SUBSETS OF POSSIBLE DECODING EVENTS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/249,243

(22) Filed: Feb. 24, 2021

(65) Prior Publication Data

US 2022/0271876 A1     Aug. 25, 2022

(51) Int. Cl.
| | |
|---|---|
| *H04L 1/1867* | (2023.01) |
| *H04L 1/20* | (2006.01) |
| *H04W 24/10* | (2009.01) |
| *H04W 72/21* | (2023.01) |
| *H04W 72/23* | (2023.01) |
| *H04W 72/53* | (2023.01) |

(52) U.S. Cl.
CPC ............ *H04L 1/1896* (2013.01); *H04L 1/203* (2013.01); *H04W 24/10* (2013.01); *H04W 72/21* (2023.01); *H04W 72/23* (2023.01); *H04W 72/53* (2023.01)

(58) Field of Classification Search
CPC ...... H04L 1/1896; H04L 1/203; H04W 24/10; H04W 72/0413; H04W 72/042; H04W 72/0493
See application file for complete search history.

(56) References Cited

U.S. PATENT DOCUMENTS

| | | | | |
|---|---|---|---|---|
| 8,942,080 B2* | 1/2015 | Shen | ............... | H04L 1/1692 |
| | | | | 370/208 |
| 10,965,434 B1* | 3/2021 | Babaei | ............... | H04L 5/0096 |
| 2010/0091892 A1* | 4/2010 | Gorokhov | ............ | H04L 1/0026 |
| | | | | 375/260 |
| 2013/0114472 A1* | 5/2013 | Tamaki | ............... | H04L 5/003 |
| | | | | 370/280 |

(Continued)

OTHER PUBLICATIONS

Intel Corp., "Bundled HARQ-ACK feedback in NR", Apr. 2017, 3GPP TSG RAN WG1 Meeting RAN1 #88bis, all pages (Year: 2017).*

*Primary Examiner* — Christopher M Crutchfield
*Assistant Examiner* — Tito Q Pham
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may monitor for two or more messages from a base station. The UE may transmit, to the base station, at least one bit (e.g., in first stage uplink control information (UCI)) that is based at least in part on combined acknowledgement feedback associated with the two or more messages and that indicates a subset of possible decoding events associated with the two or more messages. In some aspects, the UE may further transmit at least one additional bit (e.g., in second stage UCI) that is based at least in part on the combined acknowledgement feedback and that indicates a different subset of possible decoding events associated with the two or more messages. Numerous other aspects are described.

29 Claims, 10 Drawing Sheets

(56) References Cited

U.S. PATENT DOCUMENTS

2017/0353273 A1\* 12/2017 Zhang ................... H04L 1/1671
2021/0135946 A1\* 5/2021 Babaei ................. H04L 1/1812
2021/0259040 A1\* 8/2021 Babaei ................. H04W 56/00
2022/0116158 A1\* 4/2022 Park ..................... H04L 1/1861

\* cited by examiner

COMBINED ACKNOWLEDGEMENT FEEDBACK USING SUBSETS OF POSSIBLE DECODING EVENTS

FIELD OF THE DISCLOSURE

Aspects of the present disclosure generally relate to wireless communication and to techniques and apparatuses for transmitting and receiving combined acknowledgement feedback using subsets of possible decoding events.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to monitor for two or more messages from a base station; and transmit, to the base station, at least one bit that is based at least in part on combined acknowledgement feedback associated with the two or more messages and that indicates a subset of possible decoding events associated with the two or more messages.

In some aspects, a base station for wireless communication includes a memory and one or more processors operatively coupled to the memory, the memory and the one or more processors configured to transmit, to a UE, at least one configuration message that is associated with monitoring occasions for two or more messages; and receive, from the UE, at least one bit that is based at least in part on combined acknowledgement feedback associated with the two or more messages and that indicates a subset of possible decoding events associated with the two or more messages.

In some aspects, a method of wireless communication performed by a UE includes monitoring for two or more messages from a base station; and transmitting, to the base station, at least one bit that is based at least in part on combined acknowledgement feedback associated with the two or more messages and that indicates a subset of possible decoding events associated with the two or more messages.

In some aspects, a method of wireless communication performed by a base station includes transmitting, to a UE, at least one configuration message that is associated with monitoring occasions for two or more messages; and receiving, from the UE, at least one bit that is based at least in part on combined acknowledgement feedback associated with the two or more messages and that indicates a subset of possible decoding events associated with the two or more messages.

In some aspects, a non-transitory computer-readable medium storing a set of instructions for wireless communication includes one or more instructions that, when executed by one or more processors of a UE, cause the UE to monitor for two or more messages from a base station; and transmit, to the base station, at least one bit that is based at least in part on combined acknowledgement feedback associated with the two or more messages and that indicates a subset of possible decoding events associated with the two or more messages.

In some aspects, a non-transitory computer-readable medium storing a set of instructions for wireless communication includes one or more instructions that, when executed by one or more processors of a base station, cause the base station to transmit, to a UE, at least one configuration message that is associated with monitoring occasions for two or more messages; and receive, from the UE, at least one bit that is based at least in part on combined acknowledgement feedback associated with the two or more messages and that indicates a subset of possible decoding events associated with the two or more messages.

In some aspects, an apparatus for wireless communication includes means for monitoring for two or more messages from a base station; and means for transmitting, to the base station, at least one bit that is based at least in part on combined acknowledgement feedback associated with the two or more messages and that indicates a subset of possible decoding events associated with the two or more messages.

In some aspects, an apparatus for wireless communication includes means for transmitting, to a UE, at least one configuration message that is associated with monitoring occasions for two or more messages; and means for receiving, from the UE, at least one bit that is based at least in part on combined acknowledgement feedback associated with the two or more messages and that indicates a subset of possible decoding events associated with the two or more messages.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including one or more antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
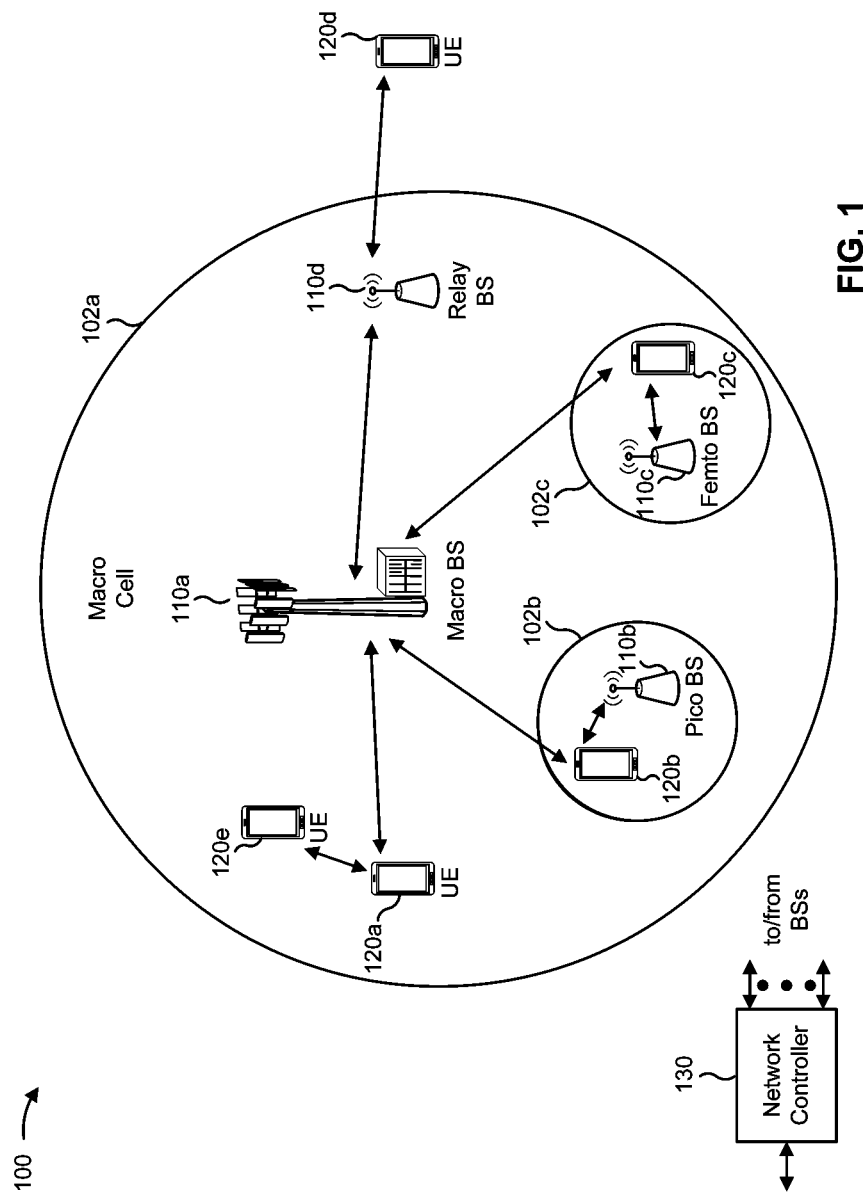
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
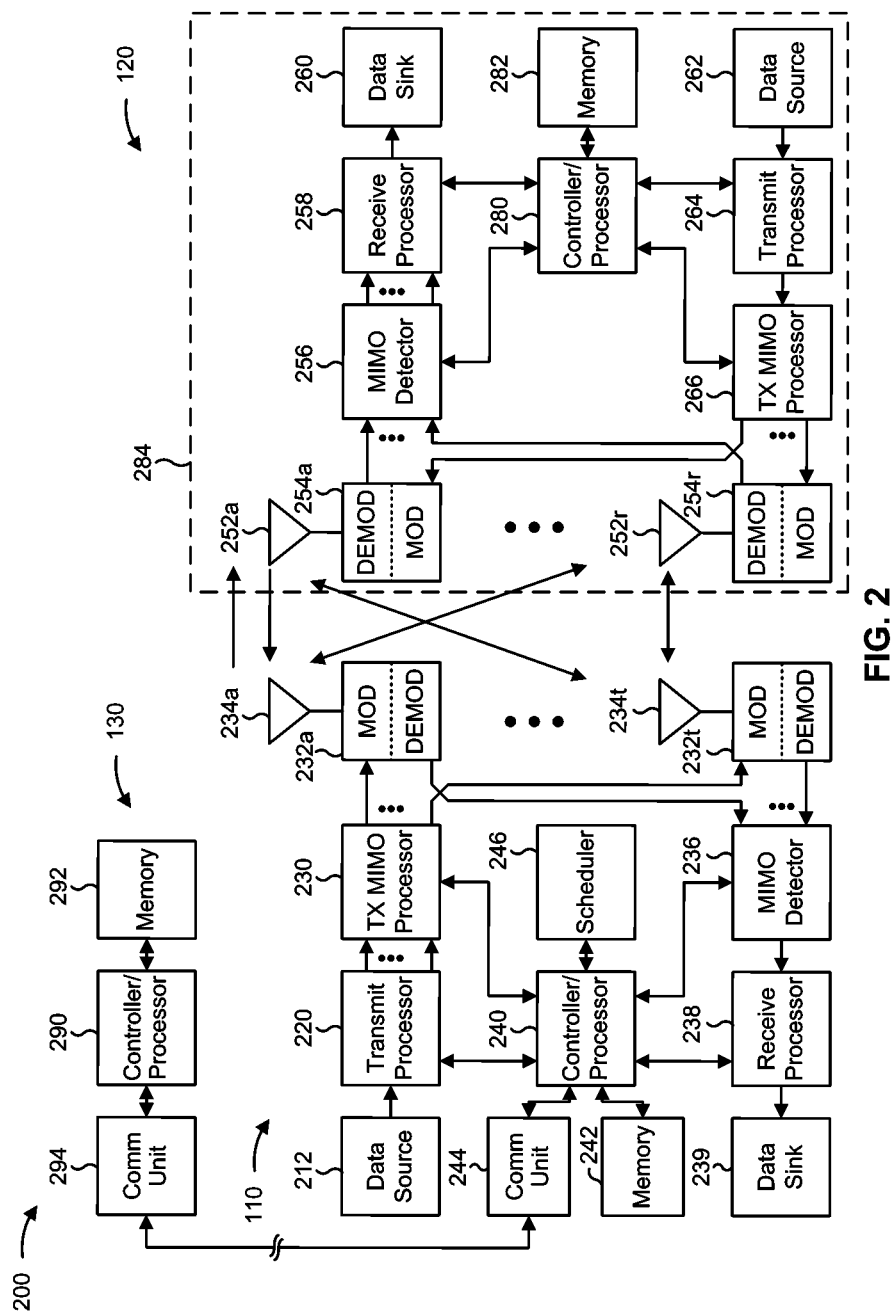
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5-8).

Controller/processor 240 of base station 110, controller/processor 280 of UE 120, and/or any other component(s) of FIG. 2 may perform one or more techniques associated with transmitting and receiving combined acknowledgement feedback using subsets of possible decoding events, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 900 of FIG. 9) may include means for monitoring for two or more messages from a base station (e.g., using one or more of antenna 252, demodulator 254, MIMO detector 256, receive processor 258, controller/processor 280, or memory 282); and/or means for transmitting, to the base station (e.g., the base station 110 and/or apparatus 1000 of FIG. 10), at least one bit that is based at least in part on combined acknowledgement feedback associated with the two or more messages and that indicates a subset of possible decoding events associated with the two or more messages (e.g., using one or more of antenna 252, transmit processor 264, TX MIMO processor 266, modulator 254, controller/processor 280, or memory 282). Accordingly, the means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for transmitting at least one additional bit that is based at least in part on the combined acknowledgement feedback and that indicates a different subset of possible decoding events associated with the two or more messages (e.g., using one or more of antenna 252, transmit processor 264, TX MIMO processor 266, modulator 254, controller/processor 280, or memory 282). In some aspects, the UE may further include means for receiving, from the base station, a configuration associated with at least one resource to use when transmitting the at least one bit and transmitting the at least one additional bit (e.g., using one or more of antenna 252, demodulator 254, MIMO detector 256, receive processor 258, controller/processor 280, or memory 282). Additionally, or alternatively, the UE may include means for receiving, from the base station, an indication of a target block error rate (BLER) (e.g., using one or more of antenna 252, demodulator 254, MIMO detector 256, receive processor 258, controller/processor 280, or memory 282).

In some aspects, a base station (e.g., the base station 110 and/or apparatus 1000 of FIG. 10) may include means for transmitting, to a UE (e.g., the UE 120 and/or apparatus 900 of FIG. 9), at least one configuration message that is associated with monitoring occasions for two or more messages (e.g., using one or more of transmit processor 220, TX MIMO processor 230, modulator 232, antenna 234, controller/processor 240, memory 242, or scheduler 246); and/or means for receiving, from the UE, at least one bit that is based at least in part on combined acknowledgement feedback associated with the two or more messages and that indicates a subset of possible decoding events associated with the two or more messages (e.g., using one or more of antenna 234, demodulator 232, MIMO detector 236, receive processor 238, controller/processor 240, memory 242, or scheduler 246). Accordingly, the means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for receiving, from the UE, at least one additional bit that is based at least in part on the combined acknowledgement feedback and that indicates a different subset of possible decoding events associated with the two or more messages (e.g., using one or more of antenna 234, demodulator 232, MIMO detector 236, receive processor 238, controller/processor 240, memory 242, or scheduler 246). In some aspects, the base station may further include means for transmitting, to the UE, a configuration associated with at least one resource to use to transmit the at least one bit and transmitting the at least one additional bit (e.g., using one or more of transmit processor 220, TX MIMO processor 230, modulator 232, antenna 234, controller/processor 240, memory 242, or scheduler 246). Additionally, or alternatively, the base station may include means for transmitting, the UE, an indication of a target BLER (e.g., using one or more of transmit processor 220, TX MIMO processor 230, modulator 232, antenna 234, controller/processor 240, memory 242, or scheduler 246).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
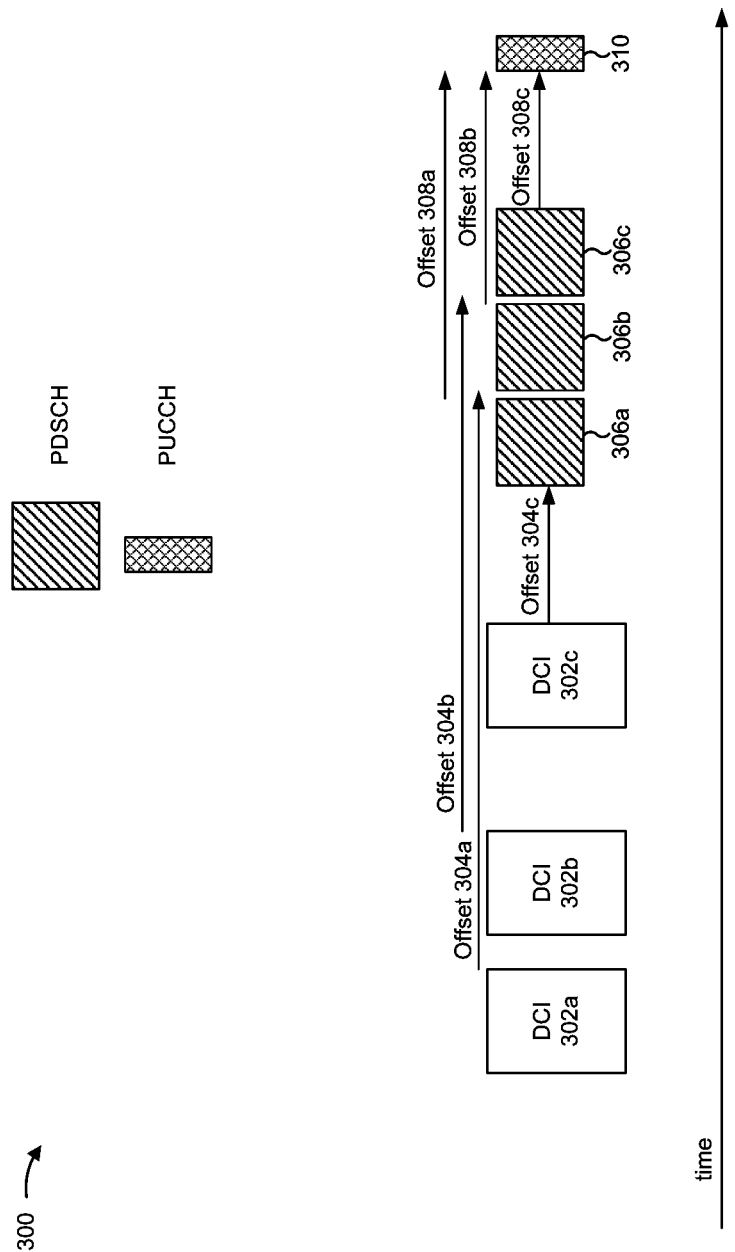
FIG. 3 is a diagram illustrating an example of dynamic grants, in accordance with the present disclosure.

FIG. 3 is a diagram illustrating an example 300 of dynamic grants, in accordance with the present disclosure. Example 300 shows different messages between a base station (e.g., base station 110) and a UE (e.g., UE 120) along a time dimension. The base station 110 may transmit, and the UE 120 may receive, dynamic grants that each indicate one or more resources (e.g., time, frequency, and/or spatial resources) that the base station 110 will use to transmit downlink data to the UE 120. In example 300, the base station 110 may transmit downlink control information (DCI) 302a (e.g., on a physical downlink control channel (PDCCH) between the base station 110 and the UE 120) to schedule downlink data transmission on one or more first resources, DCI 302b to schedule downlink data transmission on one or more second resources, and DCI 302c to schedule downlink data transmission on one or more third resources. Although described below using three DCI transmissions, the description similarly applies to fewer DCI transmissions (e.g., two DCI transmissions) or additional DCI transmissions (e.g., four DCI transmissions, five DCI transmissions, and so on).

As shown in FIG. 3, each DCI may indicate an offset (e.g., in time) between one or more symbols in which the UE 120 received the DCI and one or more symbols in which the UE 120 should monitor for downlink data from the base station 110. In example 300, DCI 302a indicates offset 304a between the DCI 302a and one or more downlink symbols 306a in which the base station 110 will transmit data (e.g., on a physical downlink shared channel (PDSCH) between the base station 110 and the UE 120). For example, offset 304a may be represented by $K_0$ in 3GPP specifications and/or another standard. Similarly, DCI 302b indicates offset 304b between the DCI 302b and one or more downlink symbols 306b in which the base station 110 will transmit data (e.g., on a PDSCH between the base station 110 and the UE 120). Similarly, DCI 302c indicates offset 304c between the DCI 302c and one or more downlink symbols 306c in which the base station 110 will transmit data (e.g., on a PDSCH between the base station 110 and the UE 120).

As further shown in FIG. 3, each DCI may indicate an offset (e.g., in time) between one or more symbols in which the UE 120 should monitor for downlink data from the base station 110 and one or more symbols in which the UE 120 should transmit acknowledgement information (e.g., acknowledgement (ACK) signals, negative-acknowledgement (NACK) signals, and/or other hybrid automatic repeat request (HARD) feedback). In example 300, DCI 302a indicates offset 308a between the one or more downlink symbols 306a in which the base station 110 will transmit data and one or more uplink symbols 310 in which the UE 120 should transmit acknowledgement information (e.g., on a physical uplink control channel (PUCCH) between the UE 120 and the base station 110). For example, offset 308a may be represented by $K_1$ in 3GPP specifications and/or another standard. Similarly, DCI 302b indicates offset 308b between the one or more downlink symbols 306b in which the base station 110 will transmit data and one or more uplink symbols 310 in which the UE 120 should transmit acknowledgement information (e.g., on a PUCCH between the UE 120 and the base station 110). Similarly, DCI 302c indicates offset 308c between the one or more downlink symbols 306c in which the base station 110 will transmit data and one or more uplink symbols 310 in which the UE 120 should transmit acknowledgement information (e.g., on a PUCCH between the UE 120 and the base station 110).

As shown in FIG. 3, the base station 110 may configure different dynamic grants with one or more overlapping symbols in which the UE 120 should transmit acknowledgement information. Accordingly, the UE 120 may transmit multiple bits in the uplink symbol(s) 310.

As indicated above, FIG. 3 is provided as an example. Other examples may differ from what is described with respect to FIG. 3.

Figure 4:
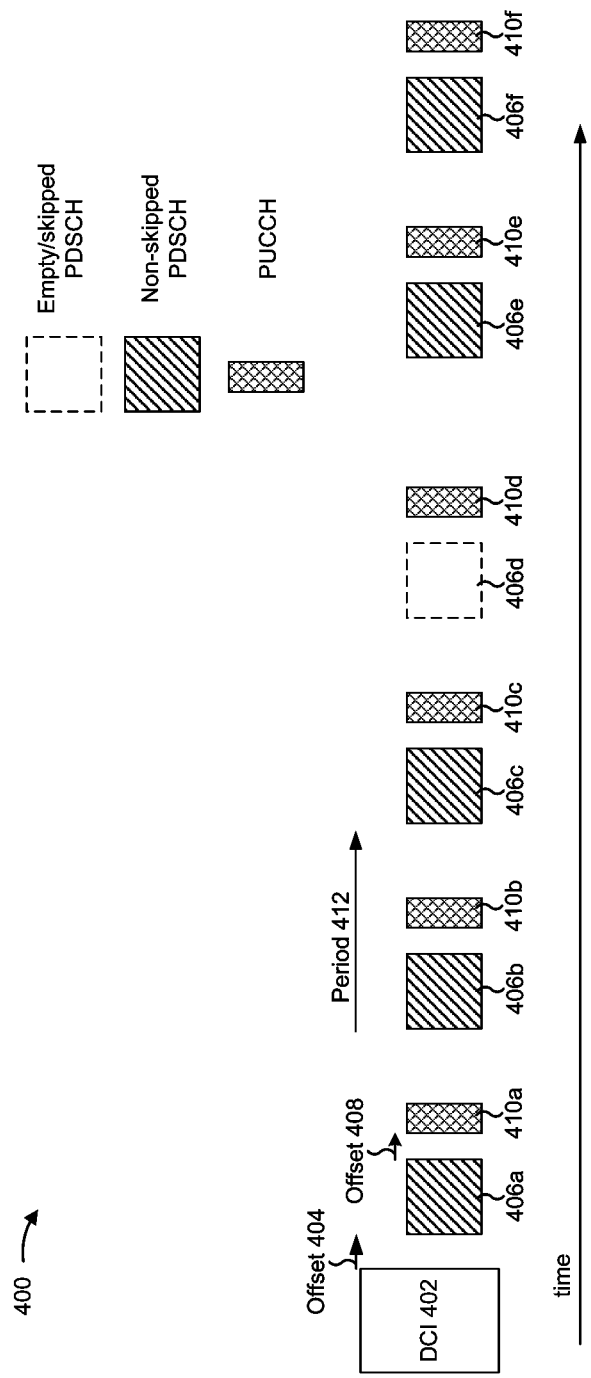
FIG. 4 is a diagram illustrating an example of a configured grant, in accordance with the present disclosure.

FIG. 4 is a diagram illustrating an example 400 of a configured grant, in accordance with the present disclosure. Example 400 shows different messages between a base station (e.g., base station 110) and a UE (e.g., UE 120) along a time dimension. The base station 110 may transmit, and the UE 120 may receive, a configured grant that indicates one or more resources (e.g., time, frequency, and/or spatial resources) that the base station 110 will use to transmit downlink data to the UE 120. For example, the base station 110 may transmit, and the UE 120 may receive, a radio resource control (RRC) message indicating the configured grant. The base station 110 may further activate the configured grant. In example 300, the base station 110 may transmit DCI 402 (e.g., on a PDCCH between the base station 110 and the UE 120) to activate the configured grant. Accordingly, the UE 120 may monitor for downlink data from the base station 110 based at least in part on the activation DCI.

As shown in FIG. 4, the activation DCI may indicate an offset (e.g., in time) between one or more symbols in which the UE 120 received that DCI and one or more symbols in which the UE 120 should monitor for downlink data from the base station 110. In example 400, DCI 402 indicates offset 404 between the DCI 402 and one or more downlink symbols 406a in which the base station 110 may transmit data (e.g., on a PDSCH between the base station 110 and the UE 120). For example, offset 404 may be represented by $K_0$ in 3GPP specifications and/or another standard.

As further shown in FIG. 4, the configured grant may include an offset (e.g., in time) between one or more symbols in which the UE 120 should monitor for downlink data from the base station 110 and one or more symbols in which the UE 120 should transmit acknowledgement information (e.g., ACKs, NACKs, and/or other HARQ feedback). In example 400, there is an offset 408 between the one or more downlink symbols 406a in which the base station 110 may transmit data and one or more uplink symbols 410a in which the UE 120 should transmit acknowledgement information (e.g., on a PUCCH between the UE 120 and the base station 110.

Unlike a dynamic grant (e.g., as described above in connection with FIG. 3), the configured grant is periodic once activated. Accordingly, the UE 120 should monitor for downlink data from the base station 110 in one or more downlink symbols that repeat according to period 412. Thus, in example 400, the UE 120 will monitor one or more downlink symbols 406a, one or more downlink symbols 406b, one or more downlink symbols 406c, one or more downlink symbols 406d, one or more downlink symbols 406e, one or more downlink symbols 406f, and so on. Similarly, in example 400, the UE 120 will transmit acknowledge information in one or more uplink symbols 410a, one or more uplink symbols 410b, one or more uplink symbols 410c, one or more uplink symbols 410d, one or more uplink symbols 410e, one or more uplink symbols 410f, and so on. As further shown in FIG. 4, the base station 110 may sometimes skip one or more downlink symbols (e.g., one or more downlink symbols 406d) and leave the symbol(s) empty by not transmitting data to the UE 120. Generally, the UE 120 will still transmit acknowledgement information (e.g., a NACK) corresponding to the skipped downlink symbol(s) (e.g., one or more uplink symbols 410d).

In some aspects, the base station 110 may further transmit, and the UE 120 may receive, DCI to deactivate the configured grant. Accordingly, the UE 120 may cease monitoring for downlink messages according to the configured grant based at least in part on the deactivation DCI. Moreover, the base station 110 may transmit, and the UE 120 may receive, DCI to reactivate the configured grant. Accordingly, the UE 120 may resume monitoring for downlink messages according to the configured grant based at least in part on the reactivation DCI.

As indicated above, FIG. 4 is provided as an example. Other examples may differ from what is described with respect to FIG. 4.

When a UE is using a configured grant, the UE may transmit a significant amount of acknowledgement information over time to a base station. These transmissions consume processing power and battery power, and the transmissions cause network overhead by occupying a spread of time resources over-the-air. Moreover, when a UE is using a plurality of dynamic grants, the UE sometimes will aggregate acknowledgement information (e.g., as described above in connection with FIG. 3). However, the UE still consumes processing power and battery power by transmitting a quantity of bits corresponding to a quantity of downlink transmissions upon which the aggregated acknowledgement information is based. Moreover, as the quantity of bits grows, the network overhead caused by the aggregated acknowledgement information, which occupies resources over-the-air, also grows.

Some techniques and apparatuses described herein enable a UE (e.g., UE 120) to transmit combined acknowledgement feedback, associated with the two or more messages, that indicates a subset of possible decoding events associated with the two or more messages. As a result, the UE 120 may conserve processing power and battery power by aggregating acknowledgement information and may reduce network overhead by using fewer bits based at least in part on the subset of possible decoding events. The techniques and apparatuses described herein may be used for dynamic grants (e.g., as described above in connection with FIG. 3) or for configured grants (e.g., as described above in connection with FIG. 4). In some aspects, a base station (e.g., the base station 110) may transmit a target BLER and/or other information described herein that the UE 120 may use to generate combined acknowledgement feedback.

Figure 5:
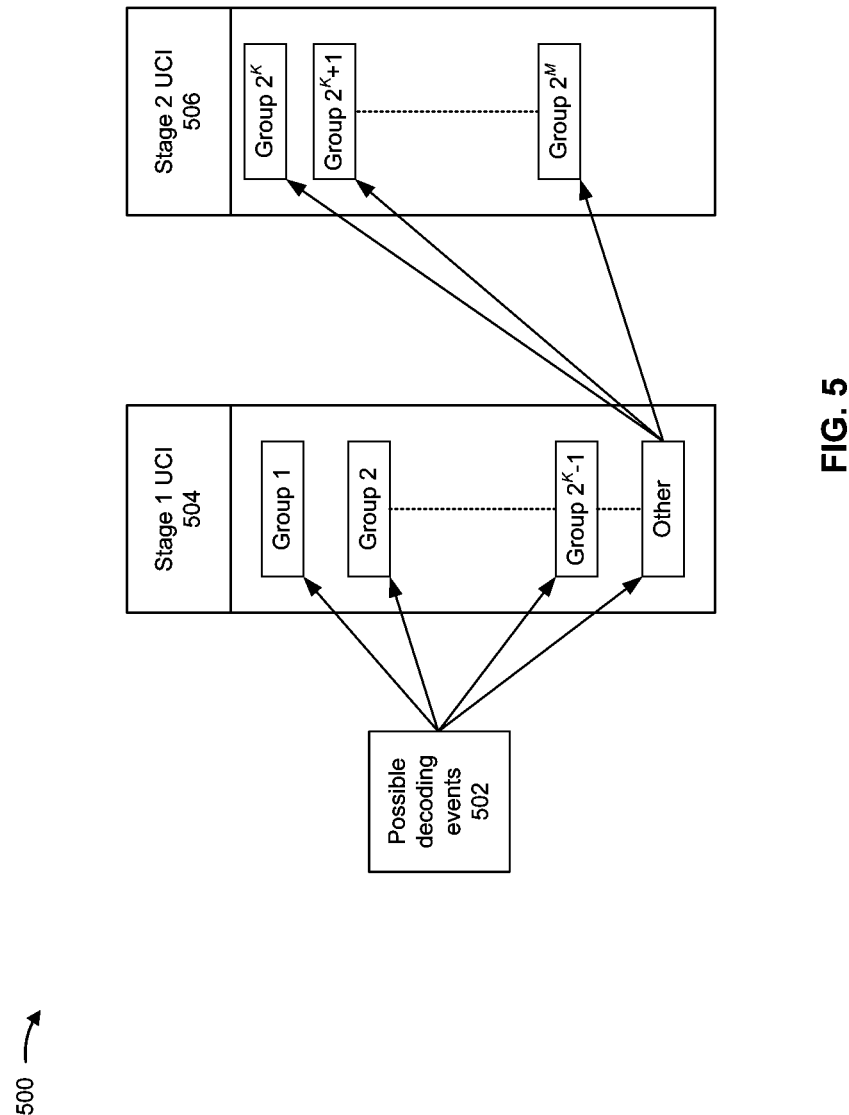
FIG. 5 is a diagram illustrating an example associated with subsets of possible decoding events, in accordance with the present disclosure.

FIG. 5 is a diagram illustrating an example 500 associated with subsets of possible decoding events, in accordance with the present disclosure. As used herein, a "decoding event" refers to an individual decoding event (e.g., a NACK, such as a failure to receive and/or decode a message, or an ACK, such as a successful reception and decoding) or to a group of related decoding events (e.g., a row of individual decoding events in example Table 1 may be referred to as a "decoding event"). As shown in FIG. 5, example 500 includes dividing a set of possible decoding events 502 associated with two or more messages (e.g., from a base station, such as base station 110, to a UE, such as UE 120) into a plurality of subsets. As used herein, a "set" of possible decoding events refers to a plurality of decoding events associated with two or more messages, where each of the plurality of decoding events is exclusive of the others of the plurality of decoding events. The set of possible decoding events 502 may include different groups of individual decoding events for the two or more messages. In one example using three messages, each message may have an associated individual decoding event of ACK or NACK. Accordingly, the set of possible decoding events may include eight different groups, as shown in Table 1 below:

TABLE 1

| Message 1 (individual event) | Message 2 (individual event) | Message 3 (individual event) | Group |
|---|---|---|---|
| ACK | ACK | ACK | 1 |
| ACK | ACK | NACK | 2 |
| ACK | NACK | ACK | 3 |
| NACK | ACK | ACK | 4 |
| NACK | NACK | ACK | 5 |
| NACK | ACK | NACK | 6 |
| ACK | NACK | NACK | 7 |
| NACK | NACK | NACK | 8 |

Thus, a quantity of groups within the set of possible decoding events 502 may be represented by $2^M$, where M may represent a quantity of messages associated with the set of possible decoding events 502.

Accordingly, at least one bit of acknowledgement feedback may be based at least in part on combined acknowledgement feedback associated with the two or more messages and may indicate a subset of possible decoding events associated with the two or more messages. For example, as shown in FIG. 5, the at least one bit may be included in first stage uplink control information (UCI) 504. As used herein, a "subset" of possible decoding events refers to one or more decoding events selected from the plurality of decoding events included in a larger set of possible decoding events. The subset of possible decoding events may include a subset of different groups from the set of possible decoding events. Accordingly, in example 500, as shown in FIG. 5, the subset may include group 1, group 2, . . . , group $2^K-1$, where K represents a quantity of bits in the first stage UCI 504. Accordingly, each codepoint for the first stage UCI 504 may be mapped to one group included in the subset except for one codepoint. This codepoint (shown as "Other" in example 500) may indicate a group of individual decoding events that is not included in the subset.

Accordingly, in some aspects, at least one additional bit of acknowledgement feedback may be based at least in part on the combined acknowledgement feedback and may indicate a different subset of possible decoding events associated with the two or more messages. For example, as shown in FIG. 5, the at least one bit may be included in second stage UCI 506. The different subset of possible decoding events may include groups, from the set of possible decoding events, that were not included in the subset associated with the first stage UCI 504. Accordingly, in example 500, as shown in FIG. 5, the different subset may include group $2^K$, group $2^K+1$, . . . , group $2^M$. Accordingly, each codepoint for the second stage UCI 506 may be mapped to one group included in the different subset.

The UE 120 and/or the base station 110 may select a quantity of bits for the first stage UCI 504 based at least in part on a reduction (e.g., a minimization) of an average quantity of bits associated with the combined acknowledgement feedback. Accordingly, the UE 120 and the base station 110 may optimize network efficiency and processing power, as well as battery life of the UE 120, by reducing the average quantity of bits associated with the combined acknowledgement feedback. In some aspects, the average quantity of bits may be represented by $$n(r) = \text{ceil}(\log_2(1+r)) + \text{ceil}(\log_2(2^M - r))P_{G_{1+r}},$$

where r represents a quantity of groups included in the subset of possible decoding events, M represents a quantity of messages associated with the set of possible decoding events 502, $P_{G_{1+r}}$ represents a probability associated with the different subset of possible decoding events (i.e., a probability of groups not included in the subset of possible decoding events). Accordingly, $$P_{G_{1+r}} = \Sigma_{m=1+r}^{2^M} P_{E_m} = 1 - \Sigma_{m=1}^{r} P_{E_m} = 1 - P_{G_r},$$

where $P_{E_m}$ represents a probability associated with group m, and $P_{G_r}$ represents a probability associated with the subset of possible decoding events (i.e., a probability of groups not included in the different subset of possible decoding events).

Accordingly, the UE 120 and/or the base station 110 may reduce (e.g., minimize) the average quantity of bits associated with the combined acknowledgement feedback. In some aspects, the base station 110 may reduce the average quantity of bits and indicate a quantity of bits to use for the first stage UCI 504, for example, in an RRC message, a control element (such as a medium access control (MAC) layer control element (MAC-CE)), and/or DCI (such as DCI described above in connection with FIG. 3, activation DCI described above in connection with FIG. 4, and/or additional DCI). As an alternative, the base station 110 may transmit, and the UE 120 may receive, data such that the UE 120 may reduce the average quantity of bits based at least in part on the data.

Because the average quantity of bits, associated with the combined acknowledgement feedback, is based at least in part on a quantity of messages associated with the set of possible decoding events 502 (e.g., represented by M in the example given above), the average quantity of bits may be based at least in part on a configuration associated with the two or more messages. For example, if the two or more messages are associated with a configured grant, the base station 110 may explicitly indicate the quantity of messages associated with the set of possible decoding events 502 in an RRC message indicating the configured grant and/or the activation DCI associated with the configured grant. In another example, if the two or more messages are associated with a dynamic grant, the base station 110 may implicitly indicate the quantity of messages associated with the set of possible decoding events 502 by transmitting a plurality of DCI that indicate one or more overlapping uplink symbols for feedback. In yet another example, the UE 120 and/or the base station 110 may determine the quantity of messages associated with the set of possible decoding events 502 by determining that one or more uplink symbols for feedback (e.g., associated with a configured grant and/or one or more dynamic grants) conflict with other transmissions and should be combined with one or more additional uplink symbols for feedback (e.g., associated with a same configured grant, a different configured grant, and/or one or more additional dynamic grants).

Additionally, or alternatively, because the average quantity of bits, associated with the combined acknowledgement feedback, is based at least in part on a probability associated with the different subset of possible decoding events (e.g., represented by $P_{G_{1+r}}$ in the example given above), the average quantity of bits may be based at least in part on an acknowledgement probability associated with the two or more messages. In some aspects, the base station 110 may estimate this acknowledgement probability (e.g., by estimating by $P_{G_{1+r}}$ in the example given above) and explicitly indicate the acknowledgement probability in an RRC message indicating a configured grant, in activation DCI associated with a configured grant, and/or in DCI associated with one or more dynamic grants. As an alternative, the base station 110 may transmit data to the UE 120 such that the UE 120 may estimate the acknowledgement probability based at least in part on the data.

For example, the acknowledgement probability may be based at least in part on a target BLER. In some aspects, the target BLER may represented by X such that a probability associated with an ACK event may be represented by 1−X, and a probability associated with a NACK event may be represented by X. Accordingly, the acknowledgement probability (e.g., represented by $P_{G_{1+r}}$ in the example given above) may be based at least in part on X. In some aspects, the base station 110 may transmit, and the UE 120 may receive, an indication of the target BLER (e.g., in an RRC message, such as an RRC message indicating a configured grant as described above in connection with FIG. 4; a MAC-CE; and/or DCI, such as DCI described above in connection with FIG. 3, activation DCI described above in connection with FIG. 4, and/or additional DCI).

Additionally, or alternatively, the acknowledgement probability may be based at least in part on traffic patterns. In some aspects, the probability of the base station 110 skipping one or more downlink symbols (e.g., as described above in connection with FIG. 4) may be represented by Prob{skipped occasion} such that a probability of the base station 110 transmitting data may represented by Prob{non-skipped occasion}=1−Prob{skipped occasion}. Accordingly, the acknowledgement probability (e.g., represented by $P_{G_{1+r}}$ in the example given above) may be based at least in part on Prob{non-skipped occasion}. In some aspects, the base station 110 may transmit, and the UE 120 may receive, an indication of this traffic pattern (e.g., in an RRC message, such as an RRC message indicating a configured grant as described above in connection with FIG. 4 and/or an additional RRC message; a MAC-CE; and/or DCI, such as DCI described above in connection with FIG. 3, activation DCI described above in connection with FIG. 4, and/or additional DCI). Additionally with or alternatively to the target BLER and/or the traffic patterns, the base station 110 may transmit, and the UE 120 may receive, an indication of the acknowledgment probability (e.g., $P_{G_{1+r}}$ in the example given above).

In order for the UE 120 to transmit the first stage UCI 504 and, when relevant, the second stage UCI 506, the base station 110 may configure at least one resource for the UE 120 to use when transmitting the at least one bit and transmitting the at least one additional bit. For example, the base station 110 may transmit, and the UE 120 may receive, an RRC message (such as an RRC message indicating a configured grant as described above in connection with FIG. 4 and/or an additional RRC message), a MAC-CE, and/or DCI (such as DCI described above in connection with FIG. 3, activation DCI described above in connection with FIG. 4, and/or additional DCI) that indicates the at least one resource. In some aspects, the at least one resource may include a first set of symbols (e.g., OFDM symbols) to use when transmitting the at least one bit and a second set of symbols (e.g., OFDM symbols to use when transmitting the at least one additional bit.

For example, the base station 110 may assign a fixed quantity of symbols to the first set of symbols, which may be represented by X. Accordingly, the base station 110 may further assign a fixed quantity of symbols to the second set of symbols, which may be represented by Y. The base station 110 may assign Y explicitly or may indicate a fixed total quantity of symbols such that Y is implicitly indicated to be 1−X. In another example, the base station 110 may indicate a parameter (e.g., FirstStageUCINumSymPerBit as may be defined in 3GPP specifications and/or another standard) via an RRC message (such as an RRC message indicating a configured grant as described above in connection with FIG. 4 and/or an additional RRC message), a MAC-CE, and/or DCI (such as DCI described above in connection with FIG. 3, activation DCI described above in connection with FIG. 4, and/or additional DCI). The parameter may indicate a quantity of symbols (e.g., OFDM symbols) per bit. Accordingly, the UE 120 and/or the base station 110 may determine a quantity of symbols for the first set of symbols based at least in part on a quantity of bits used for the first stage UCI 504 (e.g., determined by reducing an average quantity of bits, as described above) and the parameter. For example, if the UE 120 and/or the base station 110 determine to use 4 bits for the first stage UCI 504, and the parameter is set to 1, the UE 120 may use 4 symbols for the first set of symbols. The quantity of symbols for the second set of symbols may be similarly based at least in part on a quantity of bits used for the second stage UCI 506 (e.g., determined in order to provide sufficient codepoints for the different subset of possible decoding events, as described above) and the parameter. As an alternative, the base station 110 may indicate a fixed total quantity of symbols such the quantity of symbols for the second set of symbols is based at least in part on the total quantity and the quantity of symbols for the first set of symbols. For example, if the base station 110 assigns 8 total symbols, and the quantity of symbols for the first set of symbols is determined as 4, the UE 120 may use the remaining 4 symbols for the second set of symbols. In some aspects, the base station 110 may configure a maximum quantity of symbols for the first set of symbols such that the UE 120 cannot use more than the maximum quantity of symbols for the first stage UCI 504 even if using more than the maximum quantity of symbols would further reduce an average quantity of bits, as described above.

Additionally, or alternatively, the at least one resource includes a first set of resource blocks (RBs) for the UE 120 to use when transmitting the at least one bit and a second set of RBs for the UE 120 to use when transmitting the at least one additional bit. As used herein, an RB may refer to one or more subcarriers (e.g., each subcarrier may include one or more frequencies), which may be consecutive in a frequency domain. Accordingly, an RB may include a plurality of resource elements (REs), where each RE corresponds to a single subcarrier. In some aspects, the base station 110 may assign a fixed quantity of RBs to the first set of RBs, which may be represented by X. Accordingly, the base station 110 may further assign a fixed quantity of RBs to the second set of RBs, which may be represented by Y. The base station 110 may assign Y explicitly or may indicate a fixed total quantity of RBs such that Y is implicitly indicated to be 1−X. Accordingly, the first stage UCI 504 and the second stage UCI 506 may be multiplexed in frequency rather than time. In some aspects, the first stage UCI 504 and the second stage UCI 506 may be multiplexed in both frequency and time (e.g., by being assigned different RBs and different symbols).

As an alternative, the at least one resource may include a first uplink resource for the UE 120 to use when transmitting the at least one bit and a second uplink resource for the UE 120 to use when transmitting the at least one additional bit. For example, the base station 110 may indicate a first PUCCH (e.g., with a corresponding first format, first time allocation, and first frequency allocation) that the UE 120 may use to transmit the first stage UCI 504. Additionally, the base station 110 may indicate a second PUCCH (e.g., with a corresponding second format, second time allocation, and second frequency allocation) that the UE 120 may use to transmit the second stage UCI 506.

In some aspects, the base station 110 may cause the UE 120 to further conserve power by indicating that the UE 120 may refrain from transmitting first stage UCI for one or more groups. For example, the base station 110 may indicate (e.g., in an RRC message, such as an RRC message indicating a configured grant as described above in connection with FIG. 4 and/or an additional RRC message; a MAC-CE; and/or DCI, such as DCI described above in connection with FIG. 3, activation DCI described above in connection with FIG. 4, and/or additional DCI) that the base station 110 will assume one of the possible decoding events when the base station 110 does not receive any UCI. Accordingly, the base station 110 may assume a group of all ACK events, a group of all NACK events, and/or another possible decoding event when the UE 120 does not transmit any UCI.

Additionally, or alternatively, the base station 110 may further reduce network overhead by indicating that the UE 120 may refrain from transmitting second stage UCI 506. In some aspects, the base station 110 may make this indication explicitly in an RRC message (such as an RRC message indicating a configured grant as described above in connection with FIG. 4 and/or an additional RRC message), a MAC-CE, and/or DCI (such as DCI described above in connection with FIG. 3, activation DCI described above in connection with FIG. 4, and/or additional DCI). As an alternative, the base station 110 may make this indication implicitly by only allocating resources for first stage UCI 504 (e.g., as described above). Accordingly, when the UE 120 indicates a possible decoding event, in the first stage UCI 504, that is not within the subset of possible decoding events (e.g., by using a codepoint corresponding to "Other," as described above), the base station 110 may retransmit all downlink messages associated with the first stage UCI 504. However, as long as possible decoding events not included in the subset of subset of possible decoding events are associated with a low probability (e.g., $P_{G_{1+}}$ in the example given above is low), the base station 110 will conserve network overhead in the long-term.

By using techniques as described in connection with FIG. 5, the UE 120 may transmit, and the base station 110 may receive, combined acknowledgement feedback that indicates a subset of possible decoding events associated with two or more messages. As a result, the UE 120 may conserve processing power and battery power by aggregating acknowledgement information. Additionally, the base station 110 and the UE 120 may reduce network overhead by using fewer bits based at least in part on the subset of possible decoding events.

As indicated above, FIG. 5 is provided as an example. Other examples may differ from what is described with respect to FIG. 5.

Figure 6:
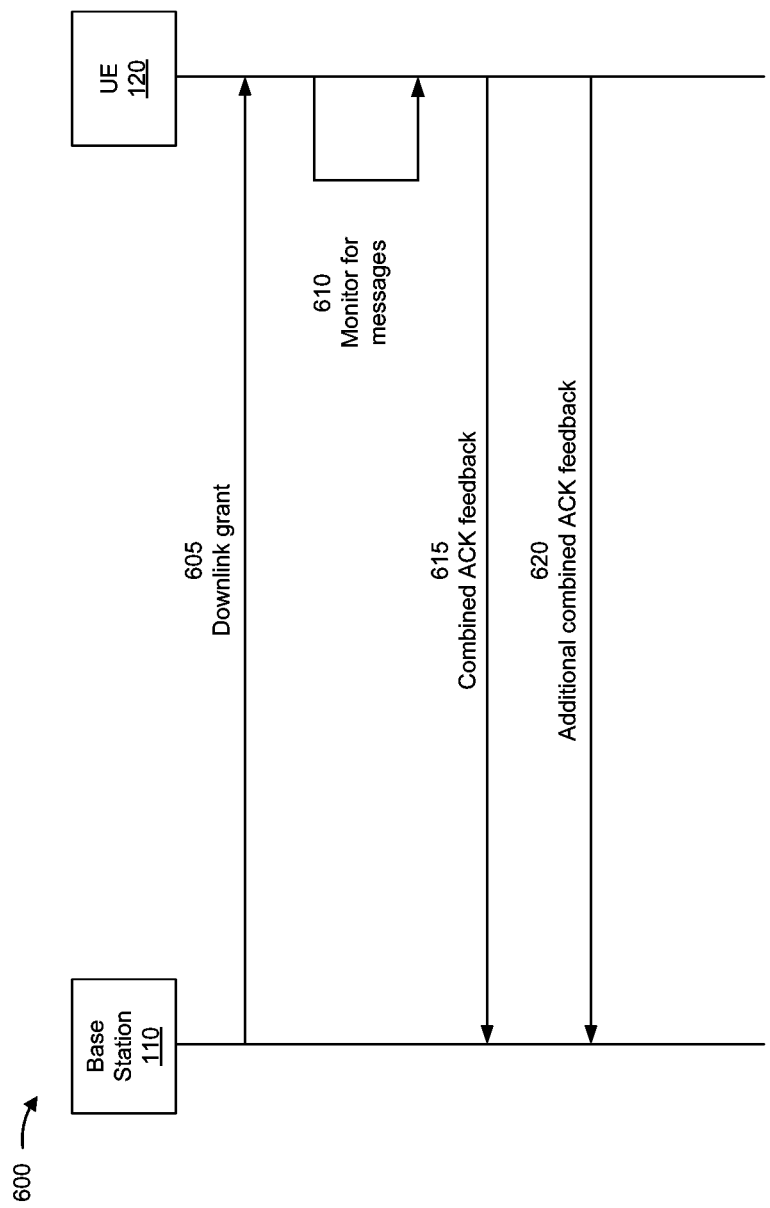
FIG. 6 is a diagram illustrating an example associated with transmitting and receiving combined acknowledgement feedback using subsets of possible decoding events, in accordance with the present disclosure.

FIG. 6 is a diagram illustrating an example 600 associated with transmitting and receiving combined acknowledgement feedback using subsets of possible decoding events, in accordance with the present disclosure. As shown in FIG. 6, example 600 includes communication between a base station 110 and a UE 120. In some aspects, the base station 110 and the UE 120 may be included in a wireless network, such as wireless network 100.

As shown in connection with reference number 605, the base station 110 may transmit, and the UE 120 may receive, at least one configuration message that is associated with monitoring occasions for two or more messages. In some aspects, the configuration may include a plurality of dynamic grants (e.g., as described above in connection with FIG. 3). Accordingly, the at least one configuration message may include DCI associated with those dynamic grants and/or other configuration messages. Additionally, or alternatively, the configuration may include a configured grant (e.g., as described above in connection with FIG. 4), such as a semi-persistent scheduling (SPS) configuration. Accordingly, the at least one configuration message may include an RRC message associated with the configured grant, activation DCI associated with the configured grant, and/or another configuration message.

In some aspects, the base station 110 may additionally transmit, and the UE 120 may receive, at least one additional configuration message associated with at least one resource to use for acknowledgement feedback. For example, the base station 110 may allocate the at least one resource as described above in connection with FIG. 5. The at least one additional configuration message may include an RRC message (such as an RRC message indicating a configured grant as described above in connection with FIG. 4 and/or an additional RRC message), a MAC-CE, and/or DCI (such as DCI described above in connection with FIG. 3, activation DCI described above in connection with FIG. 4, and/or additional DCI).

As shown in connection with reference number 610, the UE 120 may monitor for two or more messages from the base station 110. For example, the UE 120 may monitor one or more downlink symbols indicated by the at least one configuration message described above in connection with reference number 605. The one or more downlink symbols may be associated with one or more dynamic grants (e.g., as described above in connection with FIG. 3) and/or one or more configured grants (e.g., as described above in connection with FIG. 4).

As shown in connection with reference number 615, the UE 120 may transmit, and the base station 110 may receive, at least one bit that is based at least in part on combined acknowledgement feedback associated with the two or more messages and that indicates a subset of possible decoding events associated with the two or more messages. For example, the at least one bit may include first stage UCI, as described above in connection with FIG. 5. In some aspects, the subset of possible decoding events may be selected by the base station 110 and indicated to the UE 120 or selected by the UE 120 as described above in connection with FIG. 5. For example, the base station 110 and/or the UE 120 may reduce an average quantity of bits associated with the combined acknowledgement feedback to select the subset of possible decoding events (e.g., as described above in connection with FIG. 5).

In some aspects, and as shown in connection with reference number 620, the UE 120 may transmit, and the base station 110 may receive, at least one additional bit that is based at least in part on the combined acknowledgement feedback and that indicates a different subset of possible decoding events associated with the two or more messages. For example, the at least one additional bit may include second stage UCI, as described above in connection with FIG. 5. In some aspects, the UE 120 may transmit the at least one additional bit when a codepoint of the at least one bit indicates a possible decoding event not included in the subset of possible decoding events, as described above in connection with FIG. 5.

By using techniques as described in connection with FIG. 6, the UE 120 may transmit, and the base station 110 may receive, combined acknowledgement feedback that indicates a subset of possible decoding events associated with two or more messages. As a result, the UE 120 may conserve processing power and battery power by aggregating acknowledgement information. Additionally, the base station 110 and the UE 120 may reduce network overhead by using fewer bits based at least in part on the subset of possible decoding events.

As indicated above, FIG. 6 is provided as an example. Other examples may differ from what is described with respect to FIG. 6.

Figure 7:
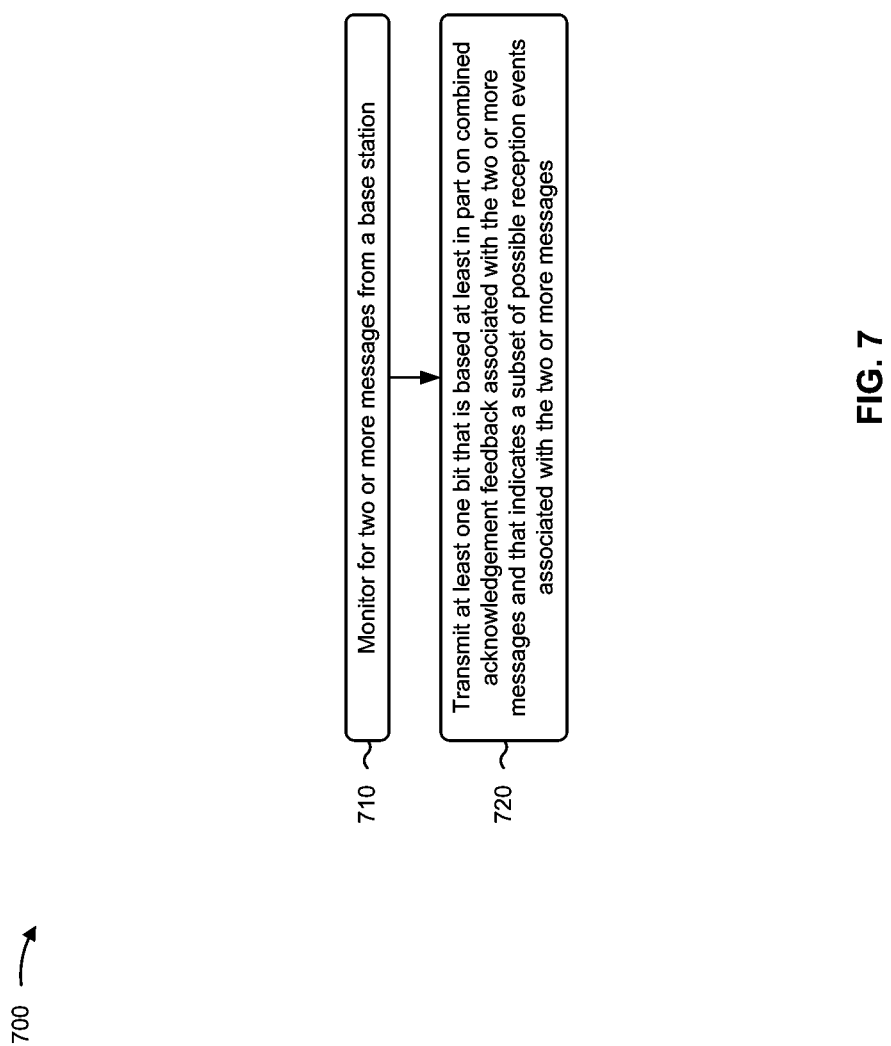
FIGS. 7 and 8 are diagrams illustrating example processes associated with transmitting and receiving combined acknowledgement feedback using subsets of possible decoding events, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with transmitting combined acknowledgement feedback using subsets of possible decoding events.

As shown in FIG. 7, in some aspects, process 700 may include monitoring for two or more messages from a base station (e.g., base station 110 and/or apparatus 1000 of FIG. 10) (block 710). For example, the UE (e.g., using monitoring component 908, depicted in FIG. 9) may monitor for two or more messages from a base station, as described above, for example, with references to FIGS. 5 and/or 6.

As further shown in FIG. 7, in some aspects, process 700 may include transmitting, to the base station, at least one bit that is based at least in part on combined acknowledgement feedback associated with the two or more messages and that indicates a subset of possible decoding events associated with the two or more messages (block 720). For example, the UE (e.g., using transmission component 904, depicted in FIG. 9) may transmit, to the base station, at least one bit that is based at least in part on combined acknowledgement feedback associated with the two or more messages and that indicates a subset of possible decoding events associated with the two or more messages, as described above, for example, with references to FIGS. 5 and/or 6.

Process 700 may include additional aspects, such as any single aspect or any combination of aspects described below and/or in connection with one or more other processes described elsewhere herein.

In a first aspect, the monitoring is based at least in part on an SPS configuration.

In a second aspect, alone or in combination with the first aspect, the at least one bit is included in first stage UCI.

In a third aspect, alone or in combination with one or more of the first and second aspects, process 700 further includes transmitting (e.g., using transmission component 904) at least one additional bit that is based at least in part on the combined acknowledgement feedback and that indicates a different subset of possible decoding events associated with the two or more messages.

In a fourth aspect, alone or in combination with one or more of the first through third aspects, the at least one additional bit is included in second stage UCI.

In a fifth aspect, alone or in combination with one or more of the first through fourth aspects, process 700 further includes receiving (e.g., using reception component 902, depicted in FIG. 9), from the base station, a configuration associated with at least one resource to use when transmitting the at least one bit and transmitting the at least one additional bit.

In a sixth aspect, alone or in combination with one or more of the first through fifth aspects, the at least one resource includes a first set of symbols to use when transmitting the at least one bit and a second set of symbols to use when transmitting the at least one additional bit.

In a seventh aspect, alone or in combination with one or more of the first through sixth aspects, the at least one resource includes a first set of RBs to use when transmitting the at least one bit and a second set of RBs to use when transmitting the at least one additional bit.

In an eighth aspect, alone or in combination with one or more of the first through seventh aspects, the at least one resource includes a first uplink resource to use when transmitting the at least one bit and a second uplink resource to use when transmitting the at least one additional bit.

In a ninth aspect, alone or in combination with one or more of the first through eighth aspects, the at least one bit includes a quantity of bits that is selected based at least in part on a minimization of an average quantity of bits associated with the combined acknowledgement feedback.

In a tenth aspect, alone or in combination with one or more of the first through ninth aspects, the average quantity of bits is based at least in part on a configuration associated with the two or more messages.

In an eleventh aspect, alone or in combination with one or more of the first through tenth aspects, the average quantity of bits is based at least in part on an acknowledgement probability associated with the two or more messages.

In a twelfth aspect, alone or in combination with one or more of the first through eleventh aspects, the acknowledgement probability is based at least in part on a target BLER.

In a thirteenth aspect, alone or in combination with one or more of the first through twelfth aspects, process 700 further includes receiving (e.g., using reception component 902), from the base station, an indication of the target BLER.

In a fourteenth aspect, alone or in combination with one or more of the first through thirteenth aspects, the target BLER is received in an RRC message, a control element, or DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
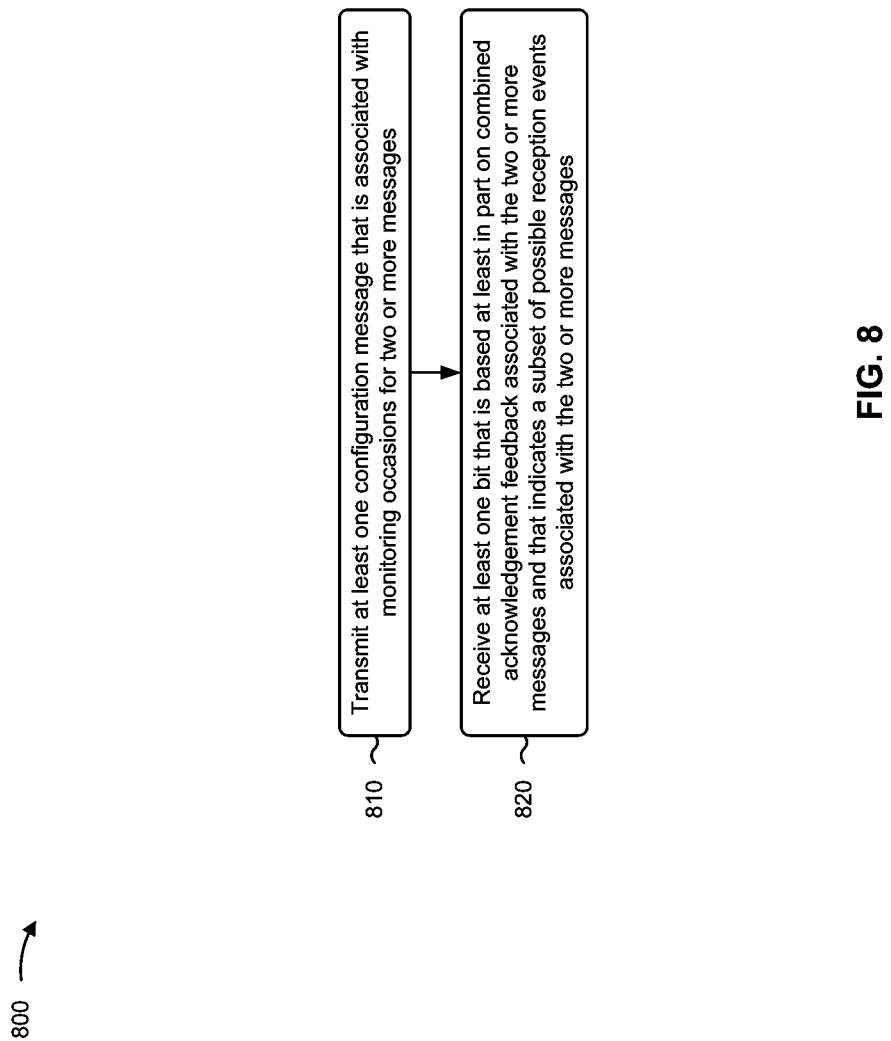

FIG. 8 is a diagram illustrating an example process 800 performed, for example, by a base station, in accordance with the present disclosure. Example process 800 is an example where the base station (e.g., base station 110 and/or apparatus 1000 of FIG. 10) performs operations associated with receiving combined acknowledgement feedback using subsets of possible decoding events.

As shown in FIG. 8, in some aspects, process 800 may include transmitting, to a UE (e.g., UE 120 and/or apparatus 900 of FIG. 9), at least one configuration message that is associated with monitoring occasions for two or more messages (block 810). For example, the base station (e.g., using transmission component 1004, depicted in FIG. 10) may transmit, to a UE, at least one configuration message that is associated with monitoring occasions for two or more messages, as described above, for example, with reference to FIGS. 5 and/or 6.

As further shown in FIG. 8, in some aspects, process 800 may include receiving, from the UE, at least one bit that is based at least in part on combined acknowledgement feedback associated with the two or more messages and that indicates a subset of possible decoding events associated with the two or more messages (block 820). For example, the base station (e.g., using reception component 1002, depicted in FIG. 10) may receive, from the UE, at least one bit that is based at least in part on combined acknowledgement feedback associated with the two or more messages and that indicates a subset of possible decoding events associated with the two or more messages, as described above, for example, with reference to FIGS. 5 and/or 6.

Process 800 may include additional aspects, such as any single aspect or any combination of aspects described below and/or in connection with one or more other processes described elsewhere herein.

In a first aspect, the configuration message is based at least in part on an SPS configuration.

In a second aspect, alone or in combination with the first aspect, the at least one bit is included in first stage UCI.

In a third aspect, alone or in combination with one or more of the first and second aspects, process 800 further includes receiving (e.g., using reception component 1002), from the UE, at least one additional bit that is based at least in part on the combined acknowledgement feedback and that indicates a different subset of possible decoding events associated with the two or more messages.

In a fourth aspect, alone or in combination with one or more of the first through third aspects, the at least one additional bit is included in second stage UCI.

In a fifth aspect, alone or in combination with one or more of the first through fourth aspects, process 800 further includes transmitting (e.g., using transmission component 1004), to the UE, a configuration associated with at least one resource to use to transmit the at least one bit and transmitting the at least one additional bit.

In a sixth aspect, alone or in combination with one or more of the first through fifth aspects, the at least one resource includes a first set of symbols to use when transmitting the at least one bit and a second set of symbols to use when transmitting the at least one additional bit.

In a seventh aspect, alone or in combination with one or more of the first through sixth aspects, the at least one resource includes a first set of RBs to use when transmitting the at least one bit and a second set of RBs to use when transmitting the at least one additional bit.

In an eighth aspect, alone or in combination with one or more of the first through seventh aspects, the at least one resource includes a first uplink resource to use when transmitting the at least one bit and a second uplink resource to use when transmitting the at least one additional bit.

In a ninth aspect, alone or in combination with one or more of the first through eighth aspects, the at least one bit includes a quantity of bits that is selected based at least in part on a minimization of an average quantity of bits associated with the combined acknowledgement feedback.

In a tenth aspect, alone or in combination with one or more of the first through ninth aspects, the average quantity of bits is based at least in part on a configuration associated with the two or more messages.

In an eleventh aspect, alone or in combination with one or more of the first through tenth aspects, the average quantity of bits is based at least in part on an acknowledgement probability associated with the two or more messages.

In a twelfth aspect, alone or in combination with one or more of the first through eleventh aspects, the acknowledgement probability is based at least in part on a target BLER.

In a thirteenth aspect, alone or in combination with one or more of the first through twelfth aspects, process 800 further includes transmitting (e.g., using transmission component 1004), the UE, an indication of the target BLER.

In a fourteenth aspect, alone or in combination with one or more of the first through thirteenth aspects, the target BLER is transmitted in an RRC message, a control element, or DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
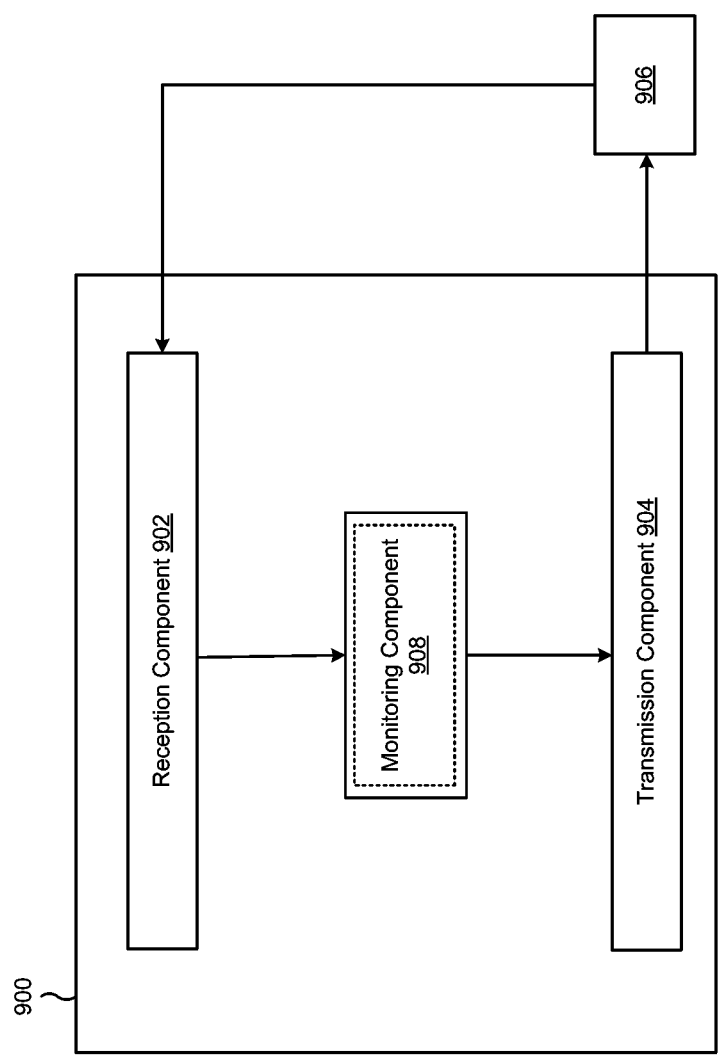
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a monitoring component 908, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. For example, reception component 902 may include one or more of antenna 252, demodulator 254, MIMO detector 256, receive processor 258, controller/processor 280, and/or memory 282. Similarly, monitoring component 908 may include one or more of antenna 252, demodulator 254, MIMO detector 256, receive processor 258, controller/processor 280, and/or memory 282. Transmission component 904 may include one or more of antenna 252, transmit processor 264, TX MIMO processor 266, modulator 254, controller/processor 280, and/or memory 282. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the monitoring component 908 may monitor for two or more messages from the apparatus 906. In some aspects, the monitoring component 908 may include one or more antennas, a demodulator, a MIMO detector, a receive processor, a controller/processor, a memory, or a combination thereof, of the UE described above in connection with FIG. 2. The transmission component 904 may transmit, to the apparatus 906, at least one bit that is based at least in part on combined acknowledgement feedback associated with the two or more messages and that indicates a subset of possible decoding events associated with the two or more messages. In some aspects, the transmission component 904 may further transmit at least one additional bit that is based at least in part on the combined acknowledgement feedback and that indicates a different subset of possible decoding events associated with the two or more messages.

In some aspects, the reception component 902 may receive, from the apparatus 906, a configuration associated with at least one resource to use when transmitting the at least one bit and transmitting the at least one additional bit. Additionally, or alternatively, the reception component 902 may receive, from the apparatus 906, an indication of a target BLER (e.g., used at least in part to divide the possible decoding events into subsets).

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
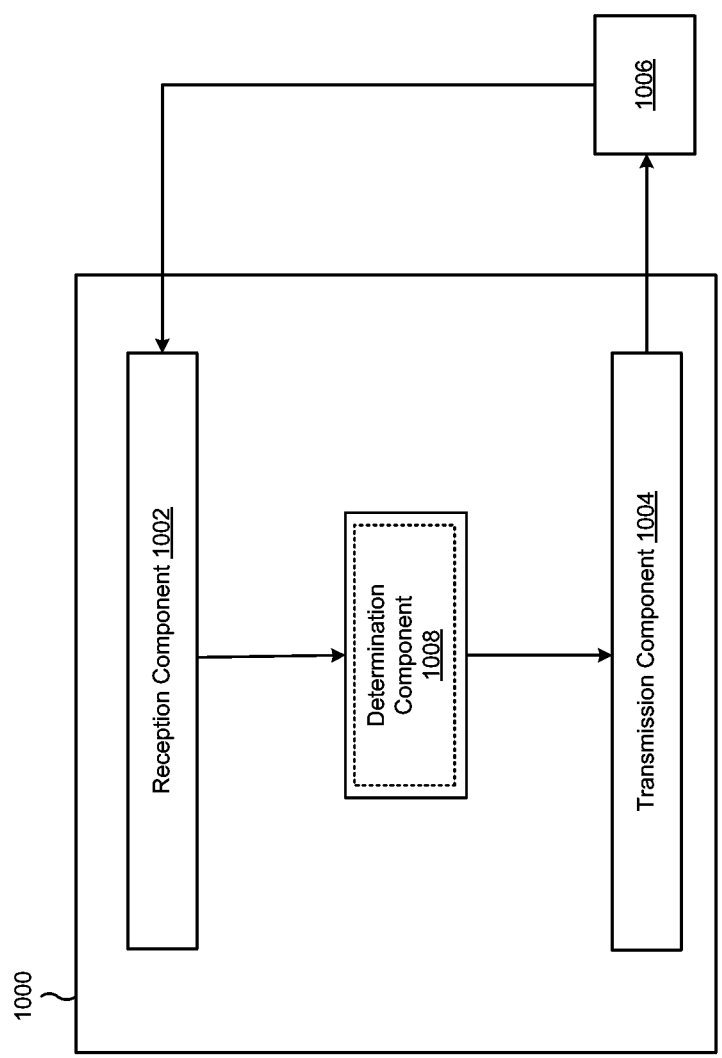

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. For example, reception component 1002 may include one or more of antenna 234, demodulator 232, MIMO detector 236, receive processor 238, controller/processor 240, memory 242, and/or scheduler 246. Similarly, transmission component 1004 may include one or more of transmit processor 220, TX MIMO processor 230, modulator 232, antenna 234, controller/processor 240, memory 242, and/or scheduler 246. Determination component 1008 may include one or more of transmit processor 220, TX MIMO processor 230, MIMO detector 236, receive processor 238, controller/processor 240, memory 242, and/or scheduler 246. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

In some aspects, the transmission component 1004 may transmit, to the apparatus 1006, at least one configuration message that is associated with monitoring occasions for two or more messages. The reception component 1002 may receive, from the apparatus 1006, at least one bit that is based at least in part on combined acknowledgement feedback associated with the two or more messages and that indicates a subset of possible decoding events associated with the two or more messages. For example, the determination component 1008 may divide the possible decoding events into subsets. In some aspects, the determination component 1008 may include a MIMO detector, a receive processor, a transmit MIMO processor, a transmit processor, a controller/processor, a memory, or a combination thereof, of the base station described above in connection with FIG. 2. In some aspects, the reception component 1002 may further receive, from the apparatus 1006, at least one additional bit that is based at least in part on the combined acknowledgement feedback and that indicates a different subset of possible decoding events associated with the two or more messages.

In some aspects, the transmission component 1004 may transmit, to the apparatus 1006, a configuration associated with at least one resource to use to transmit the at least one bit and transmitting the at least one additional bit. Additionally, or alternatively, the transmission component 1004 may transmit, the apparatus 1006, an indication of a target BLER (e.g., used to divide the possible decoding events into subsets, as described above).

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: monitoring for two or more messages from a base station; and transmitting, to the base station, at least one bit that is based at least in part on combined acknowledgement feedback associated with the two or more messages and that indicates a subset of possible decoding events associated with the two or more messages.

Aspect 2: The method of Aspect 1, wherein the monitoring is based at least in part on a semi-persistent scheduling configuration.

Aspect 3: The method of any of Aspects 1 through 2, wherein the at least one bit is included in first stage uplink control information.

Aspect 4: The method of any of Aspects 1 through 3, further comprising: transmitting at least one additional bit that is based at least in part on the combined acknowledgement feedback and that indicates a different subset of possible decoding events associated with the two or more messages.

Aspect 5: The method of Aspect 4, wherein the at least one additional bit is included in second stage uplink control information.

Aspect 6: The method of any of Aspects 4 through 5, further comprising: receiving, from the base station, a configuration associated with at least one resource to use when transmitting the at least one bit and transmitting the at least one additional bit.

Aspect 7: The method of Aspect 6, wherein the at least one resource includes a first set of symbols to use when transmitting the at least one bit and a second set of symbols to use when transmitting the at least one additional bit.

Aspect 8: The method of Aspect 6, wherein the at least one resource includes a first set of resource blocks (RBs) to use when transmitting the at least one bit and a second set of RBs to use when transmitting the at least one additional bit.

Aspect 9: The method of Aspect 6, wherein the at least one resource includes a first uplink resource to use when transmitting the at least one bit and a second uplink resource to use when transmitting the at least one additional bit.

Aspect 10: The method of any of Aspects 1 through 9, wherein the at least one bit includes a quantity of bits that is selected based at least in part on a minimization of an average quantity of bits associated with the combined acknowledgement feedback.

Aspect 11: The method of Aspect 10, wherein the average quantity of bits is based at least in part on a configuration associated with the two or more messages.

Aspect 12: The method of any of Aspects 10 through 11, wherein the average quantity of bits is based at least in part on an acknowledgement probability associated with the two or more messages.

Aspect 13: The method of Aspect 12, wherein the acknowledgement probability is based at least in part on a target block error rate (BLER).

Aspect 14: The method of Aspect 13, further comprising: receiving, from the base station, an indication of the target BLER.

Aspect 15: The method of Aspect 14, wherein the target BLER is received in a radio resource control message, a control element, or downlink control information.

Aspect 16: A method of wireless communication performed by a base station, comprising: transmitting, to a user equipment (UE), at least one configuration message that is associated with monitoring occasions for two or more messages; and receiving, from the UE, at least one bit that is based at least in part on combined acknowledgement feedback associated with the two or more messages and that indicates a subset of possible decoding events associated with the two or more messages.

Aspect 17: The method of Aspect 16, wherein the configuration message is based at least in part on a semi-persistent scheduling configuration.

Aspect 18: The method of any of Aspects 16 through 17, wherein the at least one bit is included in first stage uplink control information.

Aspect 19: The method of any of Aspects 16 through 18, further comprising: receiving, from the UE, at least one additional bit that is based at least in part on the combined acknowledgement feedback and that indicates a different subset of possible decoding events associated with the two or more messages.

Aspect 20: The method of Aspect 19, wherein the at least one additional bit is included in second stage uplink control information.

Aspect 21: The method of any of Aspects 19 through 20, further comprising: transmitting, to the UE, a configuration associated with at least one resource to use to transmit the at least one bit and transmitting the at least one additional bit.

Aspect 22: The method of Aspect 21, wherein the at least one resource includes a first set of symbols to use when transmitting the at least one bit and a second set of symbols to use when transmitting the at least one additional bit.

Aspect 23: The method of Aspect 21, wherein the at least one resource includes a first set of resource blocks (RBs) to use when transmitting the at least one bit and a second set of RBs to use when transmitting the at least one additional bit.

Aspect 24: The method of Aspect 21, wherein the at least one resource includes a first uplink resource to use when transmitting the at least one bit and a second uplink resource to use when transmitting the at least one additional bit.

Aspect 25: The method of any of Aspects 16 through 24, wherein the at least one bit includes a quantity of bits that is selected based at least in part on a minimization of an average quantity of bits associated with the combined acknowledgement feedback.

Aspect 26: The method of Aspect 25, wherein the average quantity of bits is based at least in part on a configuration associated with the two or more messages.

Aspect 27: The method of any of Aspects 25 through 26, wherein the average quantity of bits is based at least in part on an acknowledgement probability associated with the two or more messages.

Aspect 28: The method of Aspect 27, wherein the acknowledgement probability is based at least in part on a target block error rate (BLER).

Aspect 29: The method of Aspect 28, further comprising: transmitting, the UE, an indication of the target BLER.

Aspect 30: The method of Aspect 29, wherein the target BLER is transmitted in a radio resource control message, a control element, or downlink control information.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the memory and the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the memory and the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
monitor for M messages from a base station, wherein M is an integer of two or more and a number of possible sets of individual decoding events associated with the M messages is represented by $2^M$;
transmit, to the base station, K bits that are based at least in part on combined acknowledgement feedback associated with the M messages, wherein K is an integer greater than or equal to two, and K is less than M;
each of $2^K-1$ sets of individual decoding events out of the $2^M$ possible sets of individual decoding events is exclusively mapped to a value of the K bits, and
one value of the K bits is mapped to all $2^M-(2^K-1)$ remaining sets of possible sets of individual decoding events.

2. The UE of claim 1, wherein the K bits are included in first stage uplink control information and wherein the one or more processors are further configured to:
transmit, to the base station, second stage uplink control information comprising at least one additional bit that is also based at least in part on the combined acknowledgement feedback, wherein at least one value of the at least one additional bit is mapped to at least some sets out of the $2^M-(2^K-1)$ remaining sets of possible sets of individual decoding events.

3. The UE of claim 2, wherein the one or more processors are further configured, when transmitting the second stage uplink control information, to multiplex the first stage uplink control information and the second stage uplink control information.

4. The UE of claim 1, wherein the K bits and at least one additional bit that is also based at least in part on the combined acknowledgement feedback are included in first stage uplink control information.

5. The UE of claim 1, wherein the one or more processors are further configured to:
   transmit, to the base station, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events; and
   receive, from the base station, a configuration associated with at least one resource to use when transmitting the K bits and transmitting the at least one additional bit.

6. The UE of claim 5, wherein the at least one resource includes:
   a first set of symbols to use when transmitting the K bits and a second set of symbols to use when transmitting the at least one additional bit,
   a first set of resource blocks (RBs) to use when transmitting the K bits and a second set of RBs to use when transmitting the at least one additional bit, or
   a first uplink resource to use when transmitting the K bits and a second uplink resource to use when transmitting the at least one additional bit.

7. The UE of claim 1, wherein K is selected based at least in part on a minimization of an average quantity of bits associated with the combined acknowledgement feedback, wherein the average quantity of bits is based at least in part on an acknowledgement probability, associated with the M messages, that is based at least in part on a target block error rate (BLER), and wherein the one or more processors are further configured to:
   receive, from the base station, an indication of the target BLER in a radio resource control message, a control element, or downlink control information.

8. A base station for wireless communication, comprising:
   a memory; and
   one or more processors coupled to the memory, the one or more processors configured to:
      transmit, to a user equipment (UE), at least one configuration message that is associated with monitoring occasions for M messages, wherein M is an integer of two or more and a number of possible sets of individual decoding events associated with the M messages is represented by $2^M$;
      receive, from the UE, K bits that are based at least in part on combined acknowledgement feedback associated with the M messages, wherein
         K is an integer greater than or equal to two, and K is less than M;
         each of $2^K-1$ sets of individual decoding events out of the $2^M$ possible sets of individual decoding events is exclusively mapped to a value of the K bits, and
         one value of the K bits is mapped to all $2^M-(2^K-1)$ remaining sets of possible sets of individual decoding events.

9. The base station of claim 8, wherein the one or more processors are further configured to:
   receive, from the UE, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events, wherein
   the K bits and the at least one additional bit are included in first stage uplink control information.

10. The base station of claim 8, wherein the one or more processors are further configured to:
   receive, from the UE, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events; and
   transmit, to the UE, a configuration associated with at least one resource to use to transmit the K bits and transmit the at least one additional bit.

11. The base station of claim 10, wherein the at least one resource includes:
   a first set of symbols to use to transmit the K bits and a second set of symbols to use to transmit the at least one additional bit,
   a first set of resource blocks (RBs) to use to transmit the K bits and a second set of RBs to use to transmit the at least one additional bit, or
   a first uplink resource to use to transmit the K bits and a second uplink resource to use to transmit the at least one additional bit.

12. The base station of claim 8, wherein K is selected based at least in part on a minimization of an average quantity of bits associated with the combined acknowledgement feedback, wherein the average quantity of bits is based at least in part on an acknowledgement probability, associated with the M messages, that is based at least in part on a target block error rate (BLER), and wherein the one or more processors are further configured to:
   transmit, to the UE, an indication of the target BLER in a radio resource control message, a control element, or downlink control information.

13. A method of wireless communication performed by a user equipment (UE), comprising:
   monitoring for M messages from a base station, wherein M is an integer of two or more and a number of possible sets of individual decoding events associated with the M messages is represented by $2^M$;
   transmitting, to the base station, K bits that are based at least in part on combined acknowledgement feedback associated with the M messages, wherein
      K is an integer greater than or equal to two, and K is less than M;
      each of $2^K-1$ sets of individual decoding events out of the $2^M$ possible sets of individual decoding events is exclusively mapped to a value of the K bits, and
      one value of the K bits is mapped to all $2^M-(2^K-1)$ remaining sets of possible sets of individual decoding events.

14. The method of claim 13, wherein the monitoring is based at least in part on a semi-persistent scheduling configuration.

15. The method of claim 13, further comprising:
   transmitting, to the base station, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events, and wherein the K bits are included in first stage uplink control information.

16. The method of claim 15, wherein the at least one additional bit is included in second stage uplink control information, and wherein transmitting the K bits and the at least one additional bit comprises:
   multiplexing the first stage uplink control information and the second stage uplink control information.

17. The method of claim 13, further comprising:
transmitting, to the base station, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events; and
receiving, from the base station, a configuration associated with at least one resource to use when transmitting the K bits and transmitting the at least one additional bit,
wherein the at least one resource includes:
a first set of symbols to use when transmitting the K bits and a second set of symbols to use when transmitting the at least one additional bit,
a first set of resource blocks (RBs) to use when transmitting the K bits and a second set of RBs to use when transmitting the at least one additional bit, or
a first uplink resource to use when transmitting the K bits and a second uplink resource to use when transmitting the at least one additional bit.

18. The method of claim 13, wherein K is selected based at least in part on a minimization of an average quantity of bits associated with the combined acknowledgement feedback.

19. The method of claim 18, wherein the average quantity of bits is based at least in part on a configuration associated with the M messages.

20. The method of claim 18, wherein the average quantity of bits is based at least in part on an acknowledgement probability associated with the M messages.

21. The method of claim 20, wherein the acknowledgement probability is based at least in part on a target block error rate (BLER).

22. The method of claim 21, further comprising:
receiving, from the base station, an indication of the target BLER.

23. The method of claim 22, wherein the target BLER is received in a radio resource control message, a control element, or downlink control information.

24. A method of wireless communication performed by a base station, comprising:
transmitting, to a user equipment (UE), at least one configuration message that is associated with monitoring occasions for M messages, wherein M is an integer of two or more and a number of possible sets of individual decoding events associated with the M messages is represented by $2^M$;
receiving, from the UE, K bits that are based at least in part on combined acknowledgement feedback associated with the M messages, wherein
K is an integer greater than or equal to two, and K is less than M;
each of $2^K-1$ sets of individual decoding events out of the $2^M$ possible sets of individual decoding events is exclusively mapped to a value of the K bits, and
one value of the K bits is mapped to all $2^M-(2^K-1)$ remaining sets of possible sets of individual decoding events.

25. The method of claim 24, wherein the configuration message is based at least in part on a semi-persistent scheduling configuration.

26. The method of claim 24, further comprising:
receiving, from the UE, at least one additional bit that is also based at least in part on the combined acknowledgement feedback, wherein at least one value of the at least one additional bit is mapped to at least some sets out of the $2^M-(2^K-1)$ remaining sets of possible sets of individual decoding events, and wherein the K bits are included in first stage uplink control information.

27. The method of claim 26, wherein the at least one additional bit is included in second stage uplink control information, and wherein receiving the K bits and the at least one additional bit comprises:
receiving the first stage uplink control information and the second stage uplink control information, wherein the first stage uplink control information and the second stage uplink control information are multiplexed.

28. The method of claim 24, wherein K is selected based at least in part on a minimization of an average quantity of bits associated with the combined acknowledgement feedback.

29. The method of claim 28, wherein the average quantity of bits is based at least in part on a configuration associated with the M messages, an acknowledgement probability associated with the M messages, or a combination thereof.

\* \* \* \* \*